United States Patent [19]

Beard

[11] Patent Number: 4,957,170

[45] Date of Patent: Sep. 18, 1990

[54] CURB AND GUTTER SHOVEL

[76] Inventor: Larry D. Beard, P.O. Box 160, Clayton, Calif. 94517

[21] Appl. No.: 386,309

[22] Filed: Jul. 28, 1989

[51] Int. Cl.$^5$ ............................................. A01B 1/00
[52] U.S. Cl. ..................................... 172/372; 37/284; 294/54.5
[58] Field of Search ............ 172/371, 372, 704, 701.1, 172/701.3; 37/266, 270, 284, 285, 278; 294/51, 54.5, 55

[56] References Cited

U.S. PATENT DOCUMENTS

| | | | |
|---|---|---|---|
| D. 267,468 | 1/1983 | Simms | 294/54.5 X |
| 853,171 | 5/1907 | Healy et al. | 294/54.5 |
| 1,375,505 | 4/1921 | Grady | 37/284 |
| 1,786,323 | 12/1930 | Welsh | 37/266 |
| 1,839,285 | 1/1932 | Winkie | 294/54.5 |
| 2,266,542 | 8/1939 | Fox | 37/284 |
| 2,734,291 | 2/1956 | Lasker | 37/270 |
| 2,785,483 | 3/1957 | Gajewski | 37/270 |
| 3,190,018 | 6/1965 | Nelson et al. | 172/704 |
| 3,343,807 | 9/1967 | Moraski | 294/54.5 |
| 3,571,838 | 3/1971 | Stasechke | 37/285 X |
| 3,942,591 | 3/1976 | Brannin | 172/371 |
| 4,538,847 | 9/1985 | Lapshansky | 294/51 |
| 4,550,943 | 11/1985 | Mirto | 294/54.5 |

FOREIGN PATENT DOCUMENTS

| | | | |
|---|---|---|---|
| 2158399 | 5/1973 | Fed. Rep. of Germany | 37/284 |
| 2828067 | 1/1980 | German Democratic Rep. | 37/266 |
| 10912 | of 1887 | United Kingdom | 37/284 |

*Primary Examiner*—Randolph A. Reese
*Assistant Examiner*—Jeffrey L. Thompson
*Attorney, Agent, or Firm*—Robert T. Kloeppel

[57] ABSTRACT

A shovel having a bottom portion with a surface edge adjacent to a surface to be scraped, top portion, one side portion at an acute internal angle with the surface edge at one end of the shovel and one side edge at an oblique internal angle with the surface edge on the other side. The side portion is located against a curb to direct the path of the shovel as well as to prevent material wedging between the shovel and the curb. The top portion has a means for preventing material for rolling over its top. A handle is attached to the shovel at an acute internal angle so that the user walks directly behind the shovel so as to maximize the transfer of energy for the removal of material. The bottom, top and side portions may be removably connected to the shovel blade so that they can be rotated to expose new wearing surfaces. The shovel may be rotated approximately 90 degrees and the same gutter may be scraped; or, without rotating the shovel, the user may cross to gutter on the other side of the road and scrape it.

24 Claims, 2 Drawing Sheets

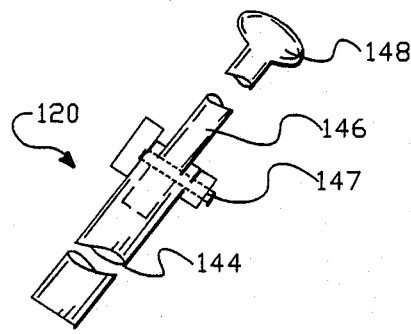
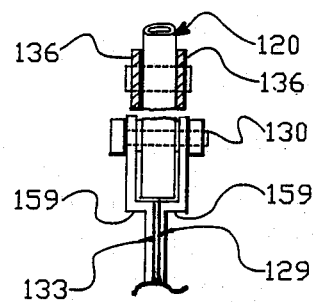
FIG.-4    FIG.-3
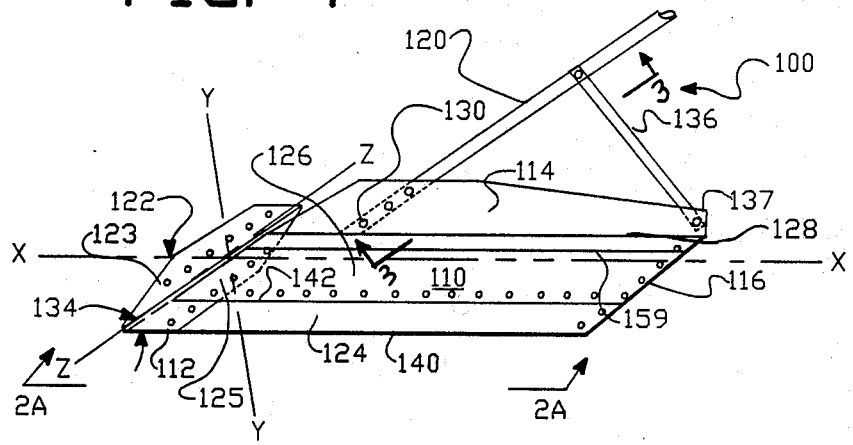
FIG.-5
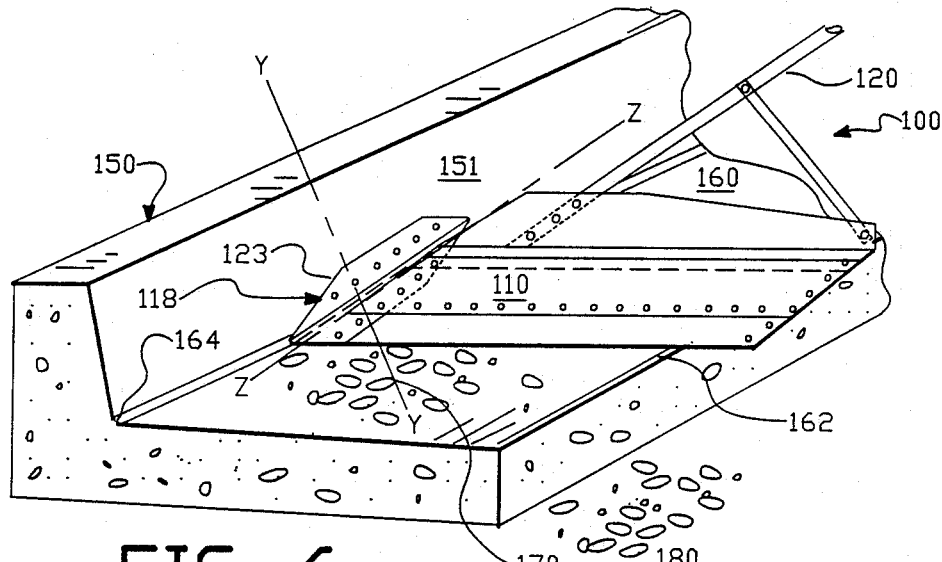
FIG.-6

CURB AND GUTTER SHOVEL

BACKGROUND OF THE INVENTION

1. Field of the Invention

This invention relates to an improved shovel that when its bottom edge is located against the gutter and its side is held against the curb and then pushed at an angle to the gutter, the shovel pushes material located on the gutter off the edge of the gutter. The shovel may be rotated approximately 90 degrees and the same gutter may be scraped; or, without rotating the shovel, the user may cross to the gutter on the other side of the road under construction and proceed along the gutter and scrape it.

2. Description of the Prior Art

When roads are constructed, a curb and guttet is first formed. Then the gravel road bed is graded prior to laying the road surface. In order to minimize the amount of material required to form the road surface, the grader blade is automatically set by a sensing device that reacts in accordance with a sonic signal that emanates from its transmitter adjacent to the grader blade and reflects off the gutter to a receiver that relays a second signal to the mechanism that adjusts blade height. Unfortunately, the signal gives incorrect readings when the sonic signal hitgs gravel or other material on the gutter surface such as a beer can. To avoid such false readings, the contractor, who is constructing the road, will require men to use a flat bed shovel and push off the material that may be laying on the gutter before the grader operation described commences. Use of a conventional shovel requires repetitious bending of the user's back to pick up and discard the material as well as several passes to remove all such material on the gutter.

Below I discuss in some detail patents that I am aware of which have disclosed shovels.

U.S. Pat. No. 853,171 discloses a shovel to remove snow from a sidewalk. The blade has top and bottom edges that are fabricated so that the lower edge is curved forward. The handle is held in place by pointed shank or end that with a socket connects the handle to the blade. The handle is also secured in place two brackets.

U.S. Pat. No. 1,375,505 discloses a street cleaning shovel. The shovel is pushed with two handles that are connected to the blade. The handles are interconnected at the end adjacent to the user through a strap. The shovel can be angularly positioned through the use of the handles so as to more easily remove snow. U.S. Pat. No. 2,266,542 discloses a snow cleaner. The cleaner includes a blade made from metal. The upper edge of the shovel is bent slightly to prevent snow from moving up and over the top of the blade. The lower edge is curved. The portion of the blade between the two end flanges is vertical. The handle is connected to the blade through a metal shoe. The shoe in turn is connected to the blade by a rivet or bolt. The shoe end, adjacent to the blade, extends into and is guided by the slot provided between a stay bar and the blade. This arrangement allows the handle to rotate 35 degrees from a perpendicular position to it fastener that connects the handle to the shovel blade.

U.S. Pat. No. 2,734,291 discloses a shovel for cleaning sidewalks that allows the shovel to slide along a surface as it carries objects to be removed to a convenient place for dumping. The blade is formed into a curved shape. At each end of the shovel blade are a pair of rockers or skids. When the blade is full with snow, the user tilts back the shovel blade and slides the blade in this position to the place where the snow can be dumped by tilting the blade up.

U.S. Pat. No. 2,785,483 discloses a shovel constructed to move snow to the side. The blade is curved. The invention also has end walls at opposite sides or ends of the blade which assist in holding the snow from falling from the shovel as well as reinforcing the blade. The handle has a plurality of braces interconnecting the handle to the blade. The blade edge adjacent to the surface to be scraped may have a toothed edge which is detachable from the blade. It is used to remove ice and snow. Resilient runners are provided to support the blade either against the surface or slightly above it. U.S. Pat. No. 3,343,807 discloses a shovel which has a pair of handles that merge into a central handle that is held by the user. The shovel also has rollers that permit the user to more effortlessly push the blade along the surface. The rollers are interconnected with the shovel handle through appendages that allow the blade to be rotated up when the user end of the handle is lowered.

U.S. Pat. No. 4,538,847 discloses a shovel which has multiple socket for the handle so that it can be located at one of several predetermined angle.

These references do not teach the permanent angle that the handle of my invention makes with the blade which assists in the flow of the material off the blade. Nor do these patents teach the novel upper portion of my invention which used to prevent the material that is scraped from the surface from rolling over the top of the blade. Similarly it does not disclose the manner that I connect the blade and the handle. The prior art does not teach the angular side portion of my invention (which is explained in more detail below) that can be rotated so that the sides may be interchanged as they wear. This feature of interchanging the edges is also possible with the bottom portion of my shovel blade which can likewise be interchanged as it wears. And by including an angular side portion on both the front and back side of the shovel blade, after the entire shovel is rotated approximately 90 degrees, the shovel may be immediately reused to scrape the same gutter as the user of my invention returns to his original position or the gutter on the other side of the road, provided the shovel is not rotated. The angularly side portion also permits my invention to fit into the drain channel formed by the angularly sloping gutter and the vertical or nearly vertical sides of the curb. The juncture of these two slopes are interconnected by a concave curve or fillet that the side wall of my invention fits. This feature eliminates the material being removed from flowing between the side of the shovel and back onto the gutter. All the above references are square edged shovels, which when used as my invention is used, result in a gap being formed between the side of the shovel and the curb which in turn allows material scraped by the shovel to roll around the shovel blade and back onto the gutter. This results in several passes to be made over the gutter to clean it—always requiring the user to lift up the shovel and while holding the handle thrust the shovel to discard the collected material. In contrast the use of my invention requires only one pass over the gutter to remove material without having to raise and thrust the shovel. I also teach a handle that may be made from at least two parts. These and other advantages of my invention will be disclosed.

SUMMARY OF THE INVENTION

My invention makes gravel removal from the gutter easier. It also can be used to remove other material from a gutter such as snow. The blade edge is held against the gutter. The side of the invention nearest the curb is held against the curb.

When the upper end of the blade is raised by means of the handle, the blade forms an angle with the gutter or the surface to be scraped. The invention is then pushed along the gutter so that the inner side of the blade which is against the curb guides the blade in a straight line. The invention includes a handle at a predetermined angle with the shovel blade so that when the user is immediately behind the shovel blade, the blade makes a vertical and horizontal angle with the gutter and curb. The actual angles are determined so as to permit the gravel to slide along the blade to the gravel road bed. This eliminates the need to pick up the shovel and move and then turn the shovel blade or move it forward to discard the material from it. The handle connected to the blade at a flange formed in the top portion of the blade.

The blade may be in one continuous piece or made into sections so that the blade portions that make up the section that wear out may be replaced without requiring replacement of the entire shovel. If side walls at 180 degrees to each other are attached to both front and back faces of the blade, my invention can be rotated approximately 90 degrees at the end of the gutter run to be cleaned of gravel so that the person pushing the shovel may then return to his original starting place on the same side of the road. Or as already mentioned, the user may just walk over the other side of the road and scrape the gutter as already mentioned without rotating the shovel. The upper edge of the shovel has a lip or other means that extends along the entire width of the blade. This means may be secured, connected or fabricated to the front and back of the shovel blade. This means prevents gravel from rolling over the top of the shovel.

I have found my invention to be a most effective means to remove gravel as the gravel slides off the end of my shovel onto the gravel bed. The blade is of sufficient width to cover the entire width of the gutter. Additionally the angle of the handle makes it convenient to walk directly behind the shovel and allow the gravel to fall off the gutter in one pass along the gutter. The shovel because of its removable portions can increase the life of the shovel.

BRIEF DESCRIPTION OF THE DRAWING

FIG. 3 is a side view of the shovel blade.

FIG. 4 illustrates the shovel handle made up of two members. FIG. 5 is an elevational of the shovel blade and handle. The shovel blade is illustrated as made up of several different members or portions.

FIG. 6 is a three dimensional view illustrating the invention in use.

DESCRIPTION OF THE PREFERRED EMBODIMENT

Figure 1:
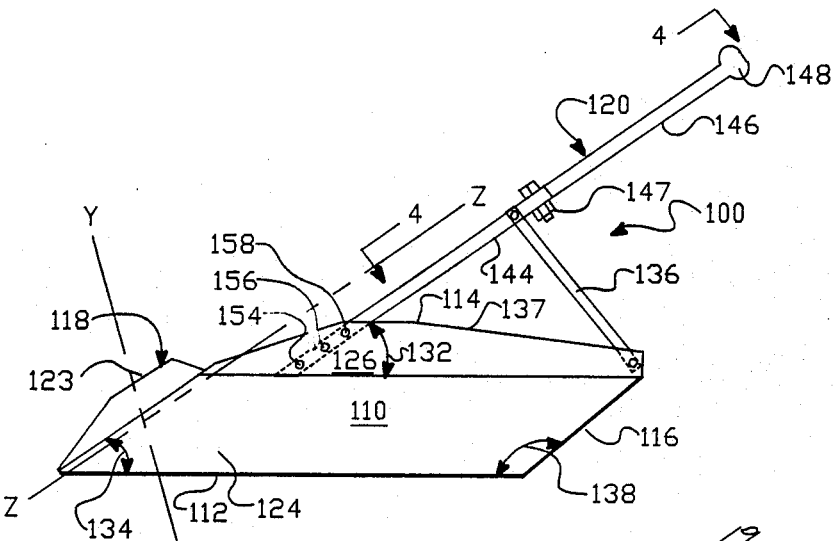
FIG. 1 is an elevational view of the shovel illustrating the blade as one continuous blade.

My invention is illustrated in FIGS. 1 through 6. My invention is a shovel 100 with shovel blade 110 and handle 120 FIG. 1. The shovel blade has a bottom edge 112, a top edge 114 and side edges 116 and 118. The shovel is pushed by the handle 120 connected to the shovel blade. This connection can be through a bolt and nut connection 130, FIG. 3, that passes through the shovel blade and the handle as illustrated or a force fit into a shank (not shown) that is in turn connected to the shovel blade as shown in FIG. 1. The handle with the shovel blade forms an angle of less than 90 degrees or an acute internal angle 132. In the preferred embodiment, this is approximately 45 degrees. Since my invention is used often to push bulky material, a bracket 136 may be used to strengthen the handle as well as the blade and the connection of the blade to the handle. The sides 116 and 118 are so fabricated that the internal angle formed between the bottom edge and the side are respectively an acute and oblique angles, 134, 138.

As illustrated in FIG. 6, the shovel 100 is placed on the gutter 160. The gutter slopes toward the curb so as to form a drainage channel at the juncture of the curb and gutter or its fillet. The shovel is moved so that side edge 118 is against curb 150 and more specifically curb face 151 and fillet 164. This permits the shovel to be pushed parallel to the curb so as to remove material 170 that is found on the gutter. As my invention is pushed along the gutter 160, the material is pushed along the blade 110 and then over the gutter edge 162 to fall on to the road bed 180. Since side edge, 118 has an upwardly protruding or angularly or curvelinearly projecting side wall 123 (FIGS. 1 and 2) which fits into the fillet between the curb and gutter, the material is directed away from the curb 150 towards the gutter edge or lip 162 and finally onto the road bed 180. Thus the shovel and material pushed by the shovel is directed along a predetermined path. The fit of side edge 118 into the fillet and against the curb face 151 prevents gravel or the objects scraped by the shovel from lodging between the curb and the shovel or flowing behind the shovel. The side edge 118 may be fabricated integrally with the shovel blade as shown in FIG. 1 or as described later secured or removably connected to the blade 110 through removable fasteners such as bolt and nut or rivets.

The embodiment of my invention that I have described includes a blade that is monolithic or one continuous member. But I have found that the life of the various part of the blade wear quickly so I illustrate in FIG. 5 an embodiment of my invention which includes a blade that is made of removable portions that when removed and rotated result in exposing new wearing surfaces so that the shovel is usable a significantly longer time than without this feature.

Figure 2A:
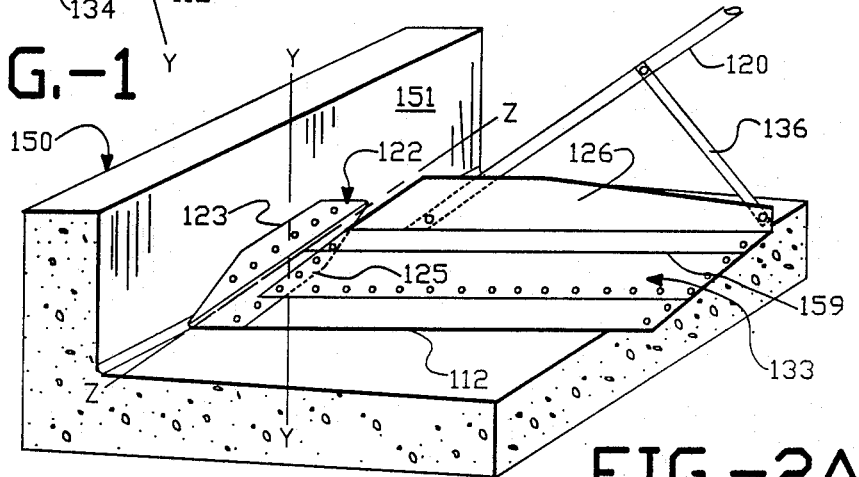
FIG. 2A shows the shovel of FIG. 5 located on a curb and gutter.

To accomplish this may invention as shown in FIG. 5 has a bottom portion 124, a top portion 126, one side portion 122 and one side edge 116. The side portion 122 and the bottom edge 112 of the bottom portion 124 forms an acute internal angle 134 at one end of the shovel blade. As also shown in FIG. 2A, the side portion may comprise a first wall 123 projecting or extending at an oblique angle or curvelinearly extending from a second wall 125 that is integral with the first wall. The second wall is removably connected to the shovel blade so when the side portion is disconnected from the shovel blade and rotated 180 degrees about its y axis and 90 degrees about its z axis, the first wall is interchanged with the second wall so that when the side portion is removably reconnected to the shovel blade, the second wall becomes a new wearing surface.

Figure 2B:
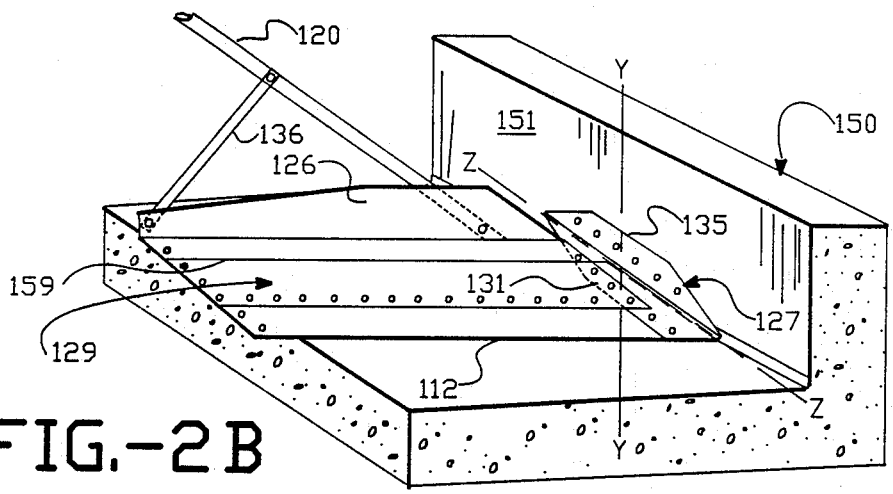
FIG. 2B is the back of the shovel of FIG. 5. This view shows the shovel just before it returns along the same gutter previously scraped by the shovel.

After the gutter is cleaned by my invention, the shovel can be returned along the same gutter by just rotating the invention about the bottom edge of the shovel blade so that the upper part of the shovel blade is approximately the same distance above the gutter. My invention is shown in this rotated position in FIG. 2B. My invention, as can be seen in FIG. 2B, may also have a similar side portion 127 shown in FIG. 2 also integral to the first wall or removably connected to the back face 129 of the shovel blade through its own second wall 131 so as to allow the user to return on the same side of the gutter by simply rotating the shovel about the bottom edge 112 of the shovel blade so that the upper edge of the shovel blade is orientated approximately the same distance above the scraped surface as before. Or in other words, the shovel may have a first wall 123 that projects from the front face 133 of the shovel blade and parallel to the curb face 151 as illustrated in FIG. 2A, 2B and 6, and an other wall 135 that extends 180 degrees from the first wall so that this other wall 135 projects from the back face 129 of the shovel blade so if the user of my invention decides to rescrape the same gutter, the user rotates the shovel about the bottom edge 112 of the shovel blade so that the upper edge of the shovel blade is orientated approximately the same distance above the scraped surface as before and fits the shovel's other wall 135 against the filled 164 and curb face 151 of curb 150 and then returns along the same gutter.

Now turning back to FIG. 5, the side edge 116 and the bottom edge 112 of the bottom portion 124 forms an oblique internal angle 138 or an internal angle of more than 90 degrees. As mentioned the side portion 122 may be removably connected or secured to the shovel blade. If so the side portion may be removed from the shovel blade and then rotated 180 degrees about its y axis and 90 degrees about its z axis resulting in the edge being interchanged so that in this new position a new edge is available when the side portion is reconnected to the shovel blade. Further the shovel blade may have a bottom portion 124 removably secured or connected to the blade. The bottom portion will have a first edge 140 and a second edge 142 wherein the first edge is adjacent to the gutter or the surface to be scraped. The second edge is removaly connected to the shovel blade so that when the first edge is disconnected from the shovel blade and then rotated 180 degrees about its x axis, and y axis the second edge is adjacent to the surface or gutter and the first edge is then removably reconnected to the shovel resulting in the shovel lasting longer by interchanging the first and second edges of the bottom portion.

As illustrated in FIG. 1, and FIG. 5 my invention may also have an upper or top portion 126 that is removably connected to the shovel blade. The upper portion has a first edge 128 and a second edge 137. The first edge is removably connected to the shovel blade 110 and the second edge is connected to the handle. Or as shown in FIG. 1, the top portion 126 may be monolithic with the shovel blade 110 as shown in FIG. 1. The top portion shown in FIG. 1 has a taper or flange so that the second edge linearly increases to a wide point at the connection of the handle to the top portion and then linearly decreases to the other end of the shovel.

One or more brackets 136 may be provided wherein one end of the bracket is connected to the shovel opposite the acute internal angle 132 formed by the handle and the shovel blade. The other end of the bracket is connected to the handle. This strengthes both the handle and the shovel blade 110.

For ease of construction as well as ease in storage, the handle may be constructed so that it is made up of a plurality of at least two members, 144 and 146, FIG. 1. One of the members will have a smaller external diameter than the internal diameter of the other member so that the memberss will fit slidably within or into the other when they are collapsed. The members may be connected through a force or tight fit, or alternatively the members may be removably connected to each other by removable fastener or such other means that are known to those skilled in the art. FIG. 4 illustrates a two member handle secured together with removable fastener 147. This connection may also be by a force fit such as a collar that is held tightly against one section of the handle when the collar is tightened by nut and bolt that draws the collar together. When the collar is loosened, a member can be moved or collapsed into another member making the shovel easier to store. The member may be held in this collapsed position by retightening the nut and bolt. For safety reasons a rounded end 148 of the handle may be connected to the exposed end of the handle. This safety feature is referred to in the claims as a means for preventing injury that may occur when rough edges at the upper end of the handle rub against a person or adjacent surfaces. This safety means may take other shapes as is commonly known by those skilled in the art.

For additional strength, the shovel handle may be secured or connected to the blade at three places 154, 156 and 158, FIG. 1. Two sets of bolts and nuts secure the handle 120 to the top portion 126. The handle is then extended from this connection to a third connection in the bottom portion 124 of the shovel. Or the shovel handle may be extended by extending member 144, FIG. 1, or providing straps (not illustrated) that are connected respectively at each of their ends to the shovel blade and the handle at the top portion and their other ends are connected to the bottom portion of the shovel.

My invention may also have a means for prevention of material from rolling over the top portion of the shovel blade. I have illustrated in FIG. 3 one such means which is an L shaped lip 159 that extends along the entire length of the upper portion 126 and is connected thereto. Another example of such means, though not illustrated, may be a flange welded or fabricated perpendicular or at an acute angle with the shovel blade. A curved upper surface may also function as such a means. This means may be duplicated on the other side of the shovel so that the shovel may be simply rotated by the user who can return to clean the same gutter.

My invention results in a more effective means to remove gravel from a curb and gutter during road construction. Time is saved. The angle of the shovel and handle results in an efficient transfer of power to the shovel so that less energy is required to push the shovel. Because of the sidewall of the side portion of the shovel which is placed against the fillet and the curb, the gutter can be cleaned automatically without having to return more than once to clean the same gutter. And of course because of the flow of the material that is removed, results in the material automatically falling onto the road bed, the user no longer has to lift, move and rotate or thrust the shovel to dump the collected material that is required with conventional shovels. This results in less back injuries as well as reducing fatigue. Additionally the angle of the handle makes it convenient to walk directly behind the shovel and allow the maximum amount of gravel to fall off the gutter. The shovel because of its removable portions can increase the life of the shovel. And the curved side members fit into the fillet between the curb and gutter so that the material may be removed with the shovel without the material flowing between the side of the shovel blade and the curb.

The foregoing presents and describes several embodiments of the invention. It is not intended to limit or otherwise narrowly construe the invention. The only limitations intended on the disclosed invention are those included in the appended claims.

What I claim:

1. A shovel for scraping material froma curb and gutter interconnected by a fillet, said curb having a curb face extending from the fillet, said shovel comprising: a shovel blade having a bottom edge and top edge and first side edge that forms an acute internal angle with the bottom edge and a second side edge that forms an oblique internal angle with the bottom edge, wherein the first side edge has a first wall that extends from the first side edge parallel to the curb face wherein the first wall conforms to the shape of the fillet and the curb face interconnecting the gutter so that the first wall of the shovel slidablely engages the fillet between the curb and gutter so as to prevent scraped material from flowing between the wall and the curb, a means for preventing material from rolling over the top edge of the shovel, said preventing means connected to the shovel blade, and a handle connected to said blade at an acute internal angle.

2. The shovel of claim 1 including at least one bracket having two ends wherein one end is connected to the shovel blade opposite the acute internal angle formed by the handle and the shovel blade, and the second end is connected to the handle so that the bracket supports the handle.

3. The shovel of claim 1 wherein the handle is removably connected at the shovel blade, said handle comprising of at least two handle members having ends wherein the end of one handle member fits into the other handle member, said handle members removably connected to each other.

4. The shovel of claim 1 wherein the top edge enlarges to form a flange wherein said flange enlarges to a wide point at the connection of the handle to the flange thereto.

5. The shovel of claim 1 wherein the shovel blade has a front and back face, wherein the first wall of the first side edge projects from the front face and the first side edge further includes an other wall that extends 180 degrees from the first wall, said first wall is located against a curb and directs the shovel and the material pushed by the shovel along a predetermined path, said other wall projects from the back side of the shovel blade and wherein the first means for preventing material from rolling over the top edge is integrally connected to the front face of the shovel blade and further the shovel blade includes a second means for preventing material from rolling over the top edge integrally connected to the back face of the shovel blade so that when a user of the shovel desires to rescrape the same gutter, the user first rotates the shovel blade about the bottom edge of the shovel blade so that the upper edge of the shovel blade is orientated approximately the same distance above the gutter as before the shovel blade rotation so that the other wall slideablely engages the fillet between the curb face and the gutter and then the user returns along the same gutter.

6. A shovel for scraping a curb and gutter interconnected with a fillet, said curb having a curb face extending from the fillet, said shovel comprising: a shovel blade having a bottom portion having a first edge adjacent to the gutter to be scraped by the shovel, a top portion, one side portion wherein the side portion conforms to the shape of the fillet and curb face interconnecting the gutter so that when the side portion and the shovel moves along the curb face the side portion prevents scraped mateial from flowing between the side portion and the curb face, wherein the side portion forms an acute internal angle with the first edge at one end of the shovel blade, and a side edge located opposite the side portion, whereby the side edge forms an oblique internal angle with the first edge of the bottom portion of the shovel, said top portion having a first means for preventing material from rolling over the top portion of the shovel blade, said first means extending horizontally along the top portion and a handle attached to said shovel blade so that the handle and shovel blade forms an acute internal angle.

7. The shovel of claim 6 wherein the bottom portion has a second edge that is removably connected to the shovel blade so that when the second edge is disconnected from the shovel blade and then suitably rotates 180 degrees, the second edge is adjacent to the gutter and in turn the first edge is removably reconnected to the shovel thus resulting in the shovel lasting longer by interchanging the first and second edges of the bottom portion.

8. The shovel of claim 7 wherein the side portion includes a first wall that projects parallel to the curb face, said first wall fits into the fillet of the curb and gutter so that when the shovel is pushed along the curb and gutter the side portion directs the shovel along the gutter when the shovel is pushed, said wall preventing material from flowing between the side portion and the curb.

9. The shovel of claim 8 wherein the side portion further includes a second wall integral with the first wall of the side portion, said side portion having a y axis perpendicular to the first wall and a z axis parallel to the first wall and said second wall removably connected to the shovel blade so when the side portion is disconnected from the shovel blade and rotated 180 degrees about its y axis and 90 degrees about its z axis, the first wal is interchanged with the second wall, and after the side portion is removably reconnected to the shovel blade, the second wall becomes a new wearing surface.

10. The shovel of claim 9 wherein the top portion is removably connected to the shovel blade, said top portion having a first and second edge wherein the first edge is connected to the shovel blade and wherein the second edge of the top portion linearly increases to a wide point at the connection of the handle to the top portion and then linearly decreases to the other end of the shovel.

11. The shovel of claim 10 including at least one bracket having two ends wherein one end is connected to the shovel opposite the acute internal angle formed by the handle and the shovel blade, said bracket connected at the other end of the bracket to the handle so as to support the handle.

12. The shovel of claim 11 wherein the handle is removablely connected to the top portion the shovel blade.

13. The shovel of claim 12 wherein the handle comprises a plurality of members, said members having ends that fit into each other so that the members slidablely fit into each other when said members are collapsed into each other, said members are removably connected to each other.

14. The shovel of claim 13 wherein the means for preventing material from rolling over the top portion of the shovel blade is a flange secured to the top portion of the shovel blade, said flange forming an angle of 90 degrees or less.

15. The shovel of claim 14 wherein the handle has two ends wherein one end is connected to the shovel and the other end has a means for preventing injury.

16. The shovel of claim 15 wherein the shovel blade has a front and back face and wherein the first wall of the side portion projects from the front face and the side portion further includes an other wall that extends 180 degrees from the first wall and parallel to the curb face, so that when said first wall is located against a curb, said first wall directs the shovel and the material pushed by the shovel along a predetermined path, said other wall projects from the back face of the shovel blade and wherein the first means for preventing material from rolling over the top edge is integrally connected to the front face of the shovel blade, and wherein the shovel blade includes a second means for preventing material from rolling over the top portion connected to the back face of the shovel blade so that when a user of the shovel desires to rescrape the same gutter, the user first rotates the shovel blade about the first edge of the bottom portion of the shovel which is adjacent to the gutter so that the upper edge of the shovel blade is orientated approximately the same distance above the gutter as before the shovel blade rotation so that the other wall is parallel to the curb face and then the user returns along the same gutter.

17. A shovel for scraping a curb and gutter interconnected with a fillet, said curb having a curb face extending from the fillet, said shovel comprising: a shovel blade having a bottom portion having a first edge adjacent to the gutter to be scraped by the shovel and a second edge, said bottom portion removably connected to the shovel blade so that when the second edge of the bottom portion is disconnected from the shovel blade and then suitably rotated 180 degrees, the second edge is adjacent to the gutter and in turn the first edge of the bottom portion is removably reconnected to the shovel so that the shovel blade lasts longer; a top portion; one side portion forming an acute internal angle with the edge of the shovel blade adjacent to the gutter, said side portion having a first wall that projects from the side portion parallel to the curb face wherein said first wall fits into the fillet of the curb and gutter so that when the shovel is pushed along the curb and gutter the side portion directs the shovel along the gutter; said first wall preventing material from flowing between the side portion and the curb and wherein the side portion further includes a second wall integral with the first wall of the side portion; said second wall of the side portion having a y axis perpendicular to the first wall ans a z axis parallel to the first wall and the second wall removably connected to the shovel blade so when the side portion is disconnected from the shovel blade and rotated 180 degrees about the second wall's y axis and 90 degrees about the second wall's z axis, the first wall is interchanged with the second wall so that when the side portion is removably reconnected to the shovel blade, the second wall becomes a new wearing surface parallel to the curb face; a side edge located opposite the side portion, the side edge forming an oblique internal angle with the edge of the bottom portion adjacent to the gutter, said top portion having a first preventing means for preventing material from rolling over the top portion of the shovel blade, said first preventing means extending horizontally along and connected to the top portion; a handle connected to said shovel blade so that the handle and shovel blade forms an acute internal angle.

18. The shovel of claim 17 including at least one bracket having two ends wherein one end is connected to the shovel opposite the acute internal angle formed by the handle and the shovel blade, said bracket connected at the other end of the bracket to the handle so as to support the handle.

19. The shovel of claim 18 wherein the handle comprises a plurality of members, said members having ends wherein the end of one handle member slidablely fits into the other handle members so that said handle members may be collapsed into each other, said members are removably connected to each other.

20. The shovel of claim 19 wherein the handle has two ends wherein one end is connected to the shovel blade and the other end has a means for preventing injury.

21. A shovel for scraping a curb and gutter interconnected with a fillet, said curb having a curb face extending from the fillet, said shovel comprising: a shovel blade having front and back face; a bottom portion having a first edge adjacent to the gutter to be scraped by the shovel and a second edge that iss removably connected to the shovel blade so that when the second edge of the bottom portion is disconnected from the shovel blade and then suitably rotated 180 degrees, the second edge of the bottom portion is adjacent to the gutter and the first edge of the bottom portion is removably reconnected to the shovel thus resulting in the shovel lasting.longer by interchanging the first and second edges of the bottom portion; a side portion forming an acute internal angle with the edge of the bottom portion which is adjacent to the gutter at one end of the shovel blade; wherein said side portion includes a first wall projecting from the front face of the shovel blade and parallel to the curb face; said side portion having a y axis perpendicular to the first wall and a z axis parallel to the first wall; and a second and integral with the first wall of the side portion, wherein said second wall is removably connected to the shovel blade so that when the side portion is disconnected from the shovel blade and rotated 180 degrees about the side portion's y axis and 90 degrees about the side portion's z axis, the first wall is interchanged with the second wall so that when the side portion is removably reconnected to the shovel blade the second wall becomes a new wearing surface; the side portion further including an other wall that extends 180 degrees from the first wall; wherein said first wall of the side portion is locatable against the fillet of the curb so as to direct the shovel and the material pushed by the shovel along a predetermined path; said other wall of the side portion projects from and is removably connected to the back face of the shovel blade, whereby said first and other walls prevents material from flowing between the side portion and the curb; and a side edge located opposite the side portion forming an oblique internal angle with the edge of the bottom portion adjacent to the gutter, a first top portion having a first means for preventing material from rolling over the top portion of the shovel blade, said first means extending horizontally along the first top portion and connected to the front face of the shovel blade; a second top portion having a second means for preventing material from rolling over the top portion connected to the back face of the shovel blade, wherein the first and second top portions are connected to the bottom portion of the shovel; whereby if a user of the shovel desires to rescrape the same gutter, the user rotates the shovel about the first edge of the bottom portion of the shovel adjacent to the gutter so that the upper edge of the shovel blade is orientated approximately the same distance above the gutter as before the shovel blade rotation so that the other wall is parallel to the curb face and the user returns along the same gutter; a handle connected to the top portion of said first and second top portions of said shovel blade so that the handle and shovel blade form an acute internal angle, wherein said first and second top portions each have an upper edge that linearly increases to a wide point at the connection of the handle.

22. The shovel of claim 21 including at least one bracket having two ends wherein one end is connected to the shovel opposite the acute internal angle formed by the handle and the shovel blade, said bracket connected at the other end of the bracket to the handle so as to support handle.

23. The shovel of claim 22 wherein the handle comprises a plurality of handle members, said handle members having ends wherein the end of one handle member fits into the other handle member so that one of the handle members slidablely fit into the other handle member when said handle members are collapsed into each other, said handle members are removably connected to each other.

24. The shovel of claim 23 wherein the handle has two ends wherein one end is connected to the shovel blade the other end has a means for preventing injury.

* * * * *